(12) United States Patent
Duan et al.

(10) Patent No.: US 9,564,825 B2
(45) Date of Patent: Feb. 7, 2017

(54) PARALLEL RESONANT CONVERTER CAPABLE OF CONTROLLING OUTPUT VOLTAGE AND CONTROL METHOD THEREOF

(71) Applicants: FSP-Powerland Technology Inc., Nanjing (CN); FSP TECHNOLOGY INC., Taoyuan County (TW)

(72) Inventors: Fei-Yue Duan, Nanjing (CN); Ming Xu, Nanjing (CN)

(73) Assignees: FSP-Powerland Technology Inc., Nanjing (CN); FSP TECHNOLOGY INC., Taoyuan (TW)

( * ) Notice: Subject to any disclaimer, the term of this patent is extended or adjusted under 35 U.S.C. 154(b) by 124 days.

(21) Appl. No.: 14/497,306

(22) Filed: Sep. 25, 2014

(65) Prior Publication Data
US 2015/0103564 A1    Apr. 16, 2015

(30) Foreign Application Priority Data

Oct. 15, 2013 (CN) .......................... 2013 1 0481071

(51) Int. Cl.
| H02M 3/335 | (2006.01) |
| H02M 3/337 | (2006.01) |
| H02M 3/28 | (2006.01) |
| H02M 1/00 | (2006.01) |

(52) U.S. Cl.
CPC .......... *H02M 3/3376* (2013.01); *H02M 3/285* (2013.01); *H02M 2001/0058* (2013.01); *Y02B 70/1433* (2013.01); *Y02B 70/1491* (2013.01)

(58) Field of Classification Search
CPC .. H02M 3/285; H02M 3/335; H02M 3/33569; H02M 3/3376; H02M 2001/0058; H02M 2001/0025; Y02B 70/1433; Y02B 70/1491
USPC .......................... 363/21.02, 21.03, 78, 79, 80
See application file for complete search history.

(56) References Cited

U.S. PATENT DOCUMENTS

| 6,707,285 | B2 * | 3/2004 | Telefus | .................... | H02M 1/10 |
| | | | | | 323/300 |
| 2002/0109487 | A1 * | 8/2002 | Telefus | ................. | H02M 3/285 |
| | | | | | 323/239 |
| 2009/0231887 | A1 * | 9/2009 | Ye | ..................... | H02M 3/33569 |
| | | | | | 363/21.02 |
| 2010/0328968 | A1 * | 12/2010 | Adragna | ............... | H02M 3/335 |
| | | | | | 363/21.02 |

(Continued)

*Primary Examiner* — Jue Zhang
*Assistant Examiner* — Jye-June Lee
(74) *Attorney, Agent, or Firm* — Jianq Chyun IP Office

(57) ABSTRACT

A parallel resonant converter including a control circuit and at least two resonant conversion circuits connected in parallel between an input bus and an output bus is provided by the invention. The control circuit is configured to provide a switching frequency signal to the at least two resonant conversion circuits. Moreover, the control circuit is further configured to control the voltage of the output bus to linearly vary along with the switching frequency signal in a rated range by using a linear current-balancing curve (gain-frequency), and thus achieving the purpose of current-balancing for the at least two resonant conversion circuits. The invention is capable of controlling the output voltage of the parallel resonant converter, so as to reduce the ripple on the output voltage of the power supply system.

14 Claims, 4 Drawing Sheets

(56) References Cited

U.S. PATENT DOCUMENTS

2011/0128758 A1\*  6/2011  Ueno .................... H02M 3/335
                                                            363/17
2014/0268907 A1\*  9/2014  Cinagrossi ............ H02M 3/285
                                                            363/21.02

\* cited by examiner

PARALLEL RESONANT CONVERTER CAPABLE OF CONTROLLING OUTPUT VOLTAGE AND CONTROL METHOD THEREOF

CROSS-REFERENCE TO RELATED APPLICATION

This application claims the priority benefit of Chinese application serial no. 201310481071.3, filed on Oct. 15, 2013. The entirety of the above-mentioned patent application is hereby incorporated by reference herein and made a part of this specification.

BACKGROUND

Technical Field

The invention relates to a resonant converter, and particularly relates to a multiphase parallel resonant converter and a control method thereof.

Related Art

LLC series resonant converter (LLC-SRC) not only has a simple structure, but also has a plurality of unique advantages, for example, a primary side switches may implement zero voltage switching (ZVS) within a full load range, and a secondary side rectifier switches may implement zero current switching (ZCS), and a wide range input voltage variation can be followed by controlling a narrow frequency variation. However, since a secondary side of the resonant converter does not have a filter inductor, ripple of an output current is quite large, which influences a service life of an output filter capacitor, and such disadvantage is more obvious in application of a large current output. In order to satisfy a ripple index of the output voltage and the output current, a multiphase LLC-SRC interleaving parallel method/technique can be adopted to overcome the aforementioned disadvantage. The interleaving parallel method refers to that frequencies of control signals of switch tubes in circuit units operated in parallel are the same, though phase angles thereof are interleaving. After the resonant converters are connected in parallel, besides that a new power supply module composed of multi-channel interleaving parallel units is constructed, a redundant parallel power supply system is also constructed.

However, when resonant parameters of the parallel resonant converters are different, direct current (DC) gain curves of various phases thereof are inevitably different, and equivalence of output gains of a two-phase resonant converter and current-balancing thereof at arbitrarily same switch frequency cannot be guaranteed. Moreover, when a load current of the parallel resonant converter is changed, the gain of the two-phase resonant converter is also varied, and such gain variation leads to output voltage variation of the two-phase resonant converter, such that accuracy of an output voltage of the power supply system deviates from/is inconsistent with requirement of electric equipment. Therefore, a control method adapted to the parallel resonant converter has to be developed, and by which current-balancing of the parallel resonant converter is achieved, and the output voltage thereof satisfies the requirement of the electric equipment.

SUMMARY

In order to resolve the problem of the related art, the invention is directed to a technical solution adapted to current-balancing of a resonant converter, and while such technical solution satisfies current-balancing of the parallel resonant converter, an output voltage thereof also satisfies requirement of electric equipment. Moreover, the invention has an effect of simple and easy in implementation.

The invention provides a parallel resonant converter including a control circuit and at least two resonant conversion circuits connected in parallel between an input bus and an output bus. The control circuit is configured to provide a switching frequency signal to the at least two resonant conversion circuits, and controls a voltage of the output bus to linearly vary along with the switching frequency signal in a rated range, so as to achieve current-balancing for the at least two resonant conversion circuits.

In an exemplary embodiment of the invention, the control circuit controls an (output) voltage and an (output) current of the output bus to present a linear relationship with a sagging characteristic, and the linear relationship with the sagging characteristic is approximated as: Vo=Vo_max−(Vo_max−Vo_min)×Io÷Ifull, where Vo is the (output) voltage of the output bus, Ifull is a full load current of the output bus, Io is the (output) current of the output bus, Vo_max is a maximum allowable value of the (output) voltage of the output bus, and Vo_min is a minimum allowable value of the (output) voltage of the output bus.

In an exemplary embodiment of the invention, the rated range is between the maximum allowable value of the (output) voltage of the output bus and the minimum allowable value of the (output) voltage of the output bus.

In an exemplary embodiment of the invention, the control circuit includes a voltage sampling circuit, a current sampling circuit, a current-voltage conversion circuit, an error amplification circuit and a voltage-frequency conversion circuit. The voltage sampling circuit samples the (output) voltage of the output bus and transmits a sampling value associated with the (output) voltage of the output bus to the error amplification circuit. The current sampling circuit samples the (output) current of the output bus and converts a sampling value associated with the (output) current of the output bus into a voltage reference value through the current-voltage conversion circuit for transmitting to the error amplification circuit. The error amplification circuit amplifies and compensates an error between the sampling value associated with the (output) voltage of the output bus and the voltage reference value, and converts the amplified and compensated error into the switching frequency signal through the voltage-frequency conversion circuit, and provides the switching frequency signal to each of the resonant conversion circuits.

In an exemplary embodiment of the invention, a relationship between the sampling value associated with the (output) current of the output bus and the voltage reference value is represented as: Vref=Vo_max−(Vo_max−Vo_min)×Io'÷Ifull, where Vref is the voltage reference value, Ifull is a full load current of the output bus, Vo_max is a maximum allowable value of the (output) voltage of the output bus, Vo_min is a minimum allowable value of the (output) voltage of the output bus, and Io' is a sampling value of the (output) current of the output bus.

In an exemplary embodiment of the invention, if the control circuit is implemented by an analog circuit, the current-voltage conversion circuit is a subtraction circuit composed of an operational amplifier, the voltage sampling circuit is a voltage-dividing circuit composed of resistors, and the current sampling circuit is composed of a sampling resistor and differential circuit, where the sampling resistor is connected in series to the output bus, and the differential circuit is used to sample a voltage at two ends of the sampling resistor. Selectively, if the control circuit is implemented by a digital controller, a following control method is programmed in the digital controller to implement control of the invention: sampling an (output) voltage of the output bus to obtain a sampling signal associated with the (output) voltage of the output bus; sampling an (output) current of the output bus to obtain a sampling signal associated with the (output) current of the output bus; converting the sampling signal associated with the (output) current of the output bus into a voltage reference signal; amplifying and compensating an error between the sampling signal associated with the (output) voltage of the output bus and the voltage reference signal for converting into a switching frequency signal; and providing the switching frequency signal to each of the resonant conversion circuits. Under such condition, a relationship between the sampling signal associated with the (output) current of the output bus and the voltage reference signal is represented as: $Vref=Vo\_max-(Vo\_max-Vo\_min)\times Io'\div Ifull$, where Vref is a voltage value of the voltage reference signal, Ifull is a full load current of the output bus, Vo_max is a maximum allowable value of the (output) voltage of the output bus, Vo_min is a minimum allowable value of the (output) voltage of the output bus, and Io' is a sampling value of the (output) current of the output bus.

In an another exemplary embodiment of the invention, the control circuit includes a voltage sampling circuit, a current sampling circuit, an adder circuit, an error amplification circuit and a voltage-frequency conversion circuit. The voltage sampling circuit samples the (output) voltage of the output bus and transmits a sampling value associated with the (output) voltage of the output bus to the adder circuit. The current sampling circuit samples the (output) current of the output bus and transmits a sampling value associated with the (output) current of the output bus to the adder circuit. An output of the adder circuit and a voltage reference value serve as inputs of the error amplification circuit, and an output of the error amplification circuit is converted into the switching frequency signal by the voltage-frequency conversion circuit, and the switching frequency signal is provided to each of the resonant conversion circuits. A relationship between the sampling value associated with the (output) current of the output bus and the (output) current of the output bus is represented as: $Io'=(Vo\_max-Vo\_min)\times Io\div Ifull$, where Vo_max is a maximum allowable value of the voltage of the output bus, Vo_min is a minimum allowable value of the voltage of the output bus, Ifull is a full load current of the output bus, Io is the (output) current of the output bus, and Io' is a sampling value of the current of the output bus. Selectively, if the control circuit is implemented by a digital controller, a following control method is programmed in the digital controller to implement control of the invention: sampling an (output) voltage of the output bus to obtain a sampling signal associated with the (output) voltage of the output bus; sampling an (output) current of the output bus to obtain a sampling signal associated with the (output) current of the output bus; adding the sampling signal associated with the (output) current of the output bus with the sampling signal associated with the (output) voltage of the output bus to obtain an adding result, and performing an error calculation on the adding result and a voltage reference signal to obtain an error value; amplifying and compensating the obtained error value for converting into the switching frequency signal; and providing the switching frequency signal to each of the resonant conversion circuits.

According to the above descriptions, not only the output voltage of the output (DC) bus can be varied between the maximum allowable output voltage value and the minimum allowable output voltage value on the output (DC) bus, a requirement on current-balancing is also satisfied. In other words, not only current-balancing of the parallel resonant conversion circuits is achieved, the output voltage also satisfies requirements of electric equipment, In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
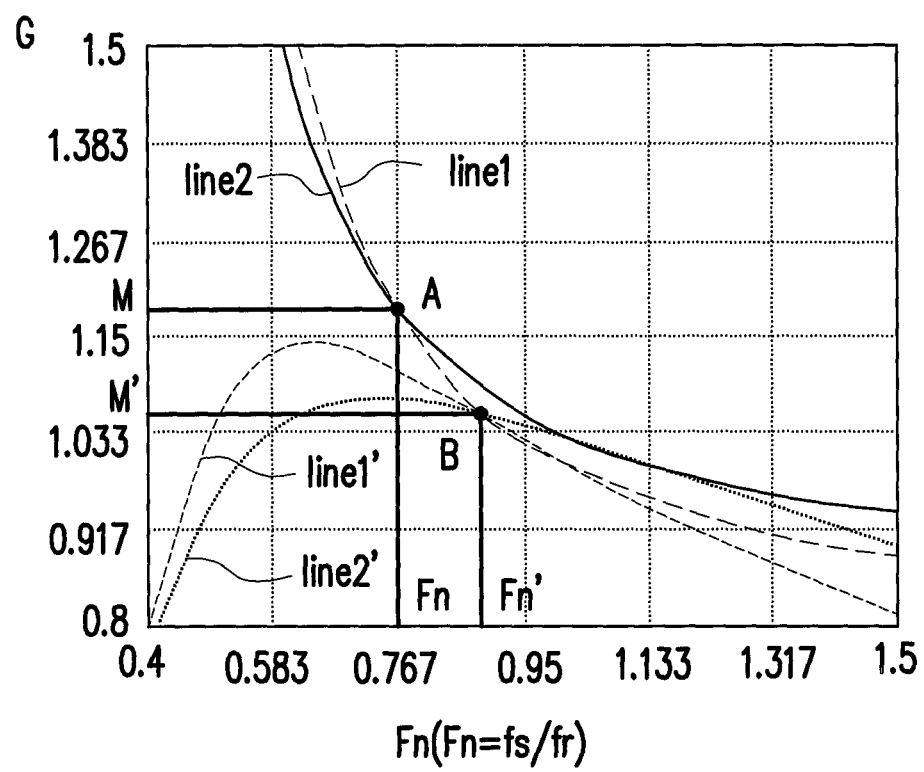
FIG. 1 is a gain curve diagram of two interleaving parallel resonant conversion circuits.

Reference will now be made in detail to the present preferred embodiments of the invention, examples of which are illustrated in the accompanying drawings. Wherever possible, the same reference numbers are used in the drawings and the description to refer to the same or like parts.

Figure 2:
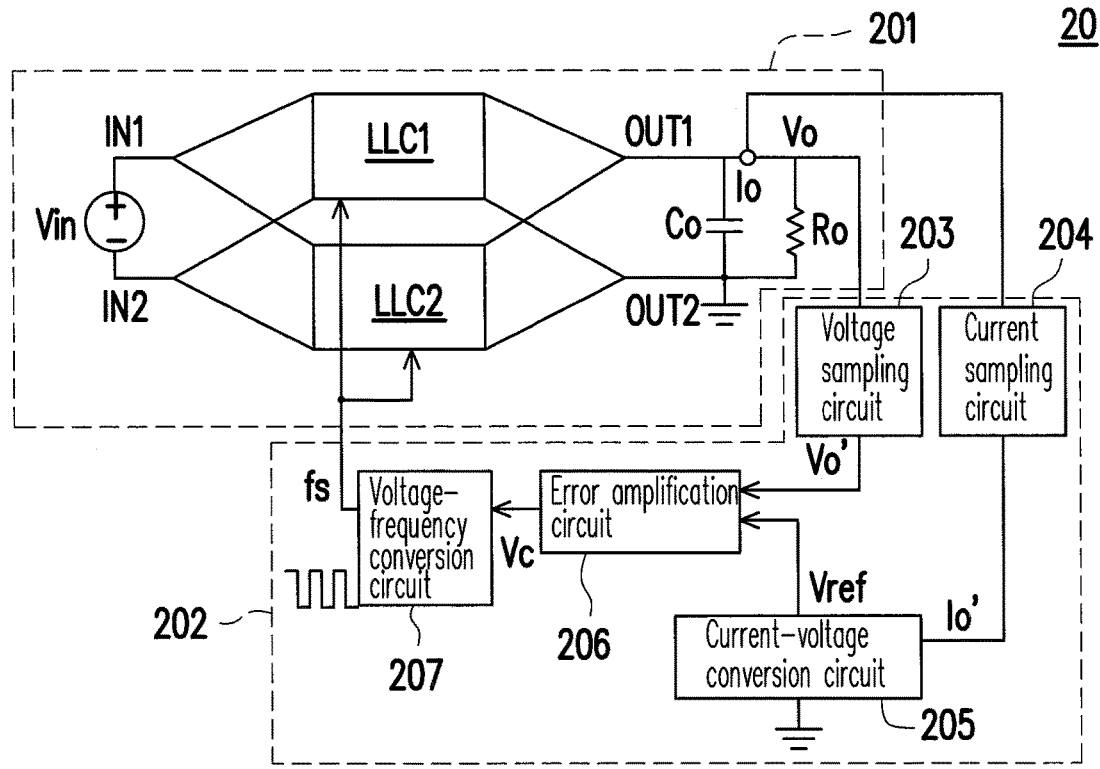
FIG. 2 is a block diagram of a power supply system according to a first exemplary embodiment of the invention.

FIG. 1 is a gain curve diagram of two interleaving parallel resonant conversion circuits. FIG. 2 is a block diagram of a power supply system according to a first exemplary embodiment of the invention. Referring to FIG. 1 and FIG. 2, the power supply system 20 at least includes a switch power supply 201 and a control circuit 202. The control circuit 202 controls a switching frequency of the switch power supply 201. Moreover, the switch power supply 201 at least includes a DC input Vin, resonant conversion circuits LLC1 and LLC2, an output filter circuit Co and a load circuit Ro. In the present exemplary embodiment, the control circuit 202 and the resonant conversion circuits LLC1 and LLC2 can be regarded as/construct a parallel resonant converter.

The resonant conversion circuits LLC1 and LLC2 are connected in parallel between input buses (IN1, IN2) and output buses (OUT1, OUT2). In the present exemplary embodiment, input terminals of the resonant conversion circuits LLC1 and LLC2 are connected in parallel and are connected to the DC input Vin through the input buses (IN1, IN2), and output terminals of the resonant conversion circuits LLC1 and LLC2 are connected in parallel and are connected to the output filter circuit Co and the load circuit Ro through the output buses (OUT1, OUT2).

The control circuit 202 provides a switching frequency signal fs to the resonant conversion circuits LLC1 and LLC2, and the control circuit 202 controls a voltage Vo of the output bus (OUT1) to linearly vary along with the switching frequency signal fs in a rated range, so as to achieve current-balancing of the resonant conversion circuits LLC1 and LLC2. The rated range is between a maximum allowable value (Vo_max) of the voltage Vo of the output bus (OUT1) and a minimum allowable value (Vo_min) of the voltage Vo of the output bus (OUT1).

In the present exemplary embodiment, the control circuit 202 at least includes a voltage sampling circuit 203, a current sampling circuit 204, a current-voltage conversion circuit 205, an error amplification circuit 206 and a voltage-frequency conversion circuit 207. The voltage sampling circuit 203 samples the (output) voltage Vo of the output bus (OUT1) and outputs a corresponding sampling value Vo'. The current sampling circuit 204 samples the (output) current Io of the output bus (OUT1) and outputs a corresponding sampling value Io'. The sampling value Io' is converted into a voltage reference value Vref by the current-voltage conversion circuit 205. The sampling value Vo' and the voltage reference value Vref are input to the error amplification circuit 206, and the error amplification circuit 206 amplifies and compensates an error between the sampling value Vo' and the voltage reference value Vref to output an error value Vc, and the voltage-frequency conversion circuit 207 converts the error value Vc into the switching frequency signal fs, and provides the switching frequency signal fs to each of the resonant conversion circuits LLC1 and LLC2.

In an exemplary embodiment, the provided switching frequency signal fs is used for controlling switching frequencies of switch units in the switch power supply 201, and the switching frequencies of the resonant conversion circuit LLC1 and the resonant conversion circuit LLC2 are the same, which are all the switching frequency signal fs.

In FIG. 2, if the control circuit 202 is implemented by an analog circuit, the voltage sampling circuit 203 is a voltage-dividing circuit composed of resistors, which is for obtaining the sampling value Vo', though the invention is not limited thereto. The current sampling circuit 204 can be composed of a sampling resistor and a differential circuit (though the invention is not limited thereto), where the sampling resistor is connected in series to the output bus (OUT1), and the differential circuit is used to sample a voltage at two ends of the sampling resistor to obtain the sampling value Io'.

The current-voltage conversion circuit 205 can be a calculation circuit composed of an operational amplifier, for example, a subtraction circuit composed of the operation amplifier, though the invention is not limited thereto. Moreover, a relationship between the sampling signal Io' associated with the (output) current Io of the output bus (OUT1) and the voltage reference value Vref may be represented as: Vref=Vo_max−(Vo_max−Vo_min)×Io'÷Ifull, where Vref is the voltage reference value, Ifull is a full load current of the output bus (OUT1), Vo_max is a maximum allowable value of the (output) voltage Vo of the output bus (OUT1), Vo_min is a minimum allowable value of the (output) voltage Vo of the output bus (OUT1), and Io' is a sampling value of the (output) current of the output bus (OUT1). In this way, through the compensation of error amplification circuit 206 and the conversion of the voltage-frequency conversion circuit 207, the control circuit 202 controls the (output) voltage Vo of the output bus (OUT1) to be equal to the voltage reference value Vref.

Figure 3:
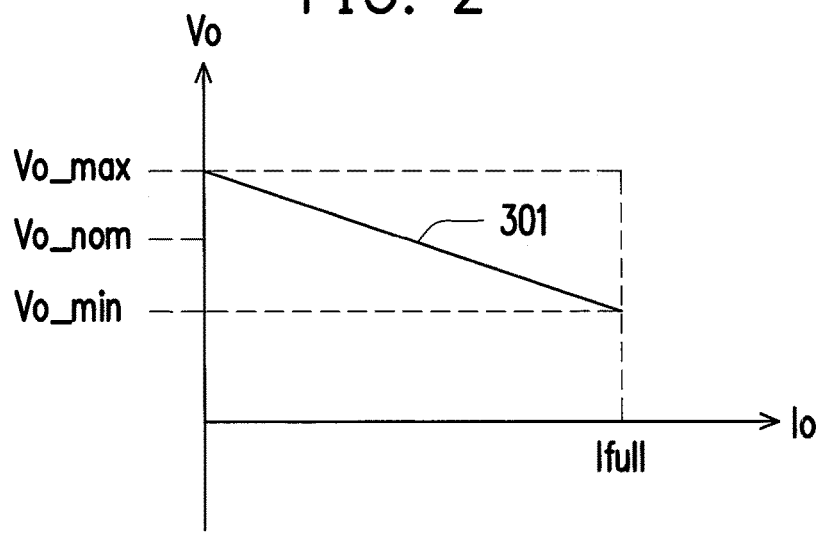
FIG. 3 is a schematic diagram illustrating a relationship between an (output) voltage and an (output) current on an output bus.

Moreover, as shown in FIG. 3, FIG. 3 is a schematic diagram illustrating a relationship between the (output) voltage Vo and the (output) current Io of the output bus (OUT1). In the present exemplary embodiment, the relationship between the (output) voltage Vo and the (output) current Io of the output bus (OUT1) is a linear relationship with a sagging characteristic as that shown in FIG. 3. The linear relationship with the sagging characteristic can be described as: Vo=Vo_max−(Vo_max−Vo_min)×Io÷Ifull, where Vo is the (output) voltage of the output bus (OUT1), Vo_max is a maximum output voltage value allowed on the output bus (OUT1) (i.e. the maximum allowable value of the (output) voltage of the output bus (OUT1)), and Vo_min is a minimum output voltage value allowed on the output bus (OUT1) (i.e. the minimum allowable value of the (output) voltage of the output bus (OUT1)), Ifull is the full load current of the output bus (OUT1), and Io is the (output) current of the output bus (OUT1). Note: "vo_nom" shown in FIG. 3 represents a rated voltage of the (output) voltage of the output bus (OUT1).

In the present exemplary embodiment, when the (output) current Io of the output bus (OUT1) is zero, the (output) voltage on the output bus (OUT1) is Vo_max. Moreover, when the (output) current Io of the output bus (OUT1) is the full load current (Ifull), the (output) voltage on the output bus (OUT1) is Vo_min. Referring to FIG. 1 again, the two resonant conversion circuits LLC1 and LLC2 connected in parallel are taken as an example for description. Since the input terminals and the output terminals of the two resonant conversion circuits LLC1 and LLC2 are respectively connected in parallel, a circuit gain (M1) of the resonant conversion circuit LLC1 and a circuit gain (M2) of the resonant conversion circuit LLC2 are identical in setting, i.e. M1=M2=M. In order to achieve a purpose of current-balancing of the resonant conversion circuits LLC1 and LLC2, a load current (Io1) of the resonant conversion circuit LLC1 and a load current (Io2) of the resonant conversion circuit LLC2 can be set to be identical, i.e.: Io1=Io2=Io/2. A gain-frequency curve of the resonant conversion circuit LLC1 is line1 when the load current is Io/2, and a gain-frequency curve of the resonant conversion circuit LLC2 is line2 when the load current is Io/2.

When the (output) current Io of the output bus (OUT1) is zero, the output currents of the resonant conversion circuits LLC1 and LLC2 are also zero. In this case, an intersection of the gain-frequency curves line1 and line2 is a current-balancing point A of the resonant conversion circuits LLC1 and LLC2, a gain of the current-balancing point A is M, and the switching frequency signal fs=Fn*fr. As the (output) voltage Vo of the output (DC) bus (OUT1) is a product of the voltage value of the (output) voltage Vo and the gain M, the (output) voltage Vo on the output bus (OUT1) is Vo_max.

Moreover, when the (output) current Io of the output bus (OUT1) is the full load current (Ifull), the (output) currents Io1' and Io2' of the resonant conversion circuits LLC1 and LLC2 are Io1'=Io2'=Ifull/2, and the respective gain-frequency curves thereof are respectively changed to line1' and line2'. In this case, an intersection of the gain-frequency curves line1' and line2' is a current-balancing point B of the resonant conversion circuits LLC1 and LLC2, a gain of the current-balancing point B is M', and the switching frequency signal fs'=Fn'*fr. As the (output) voltage Vo of the output (DC) bus (OUT1) is a product of the voltage value of the (output) voltage Vo and the gain M', the (output) voltage Vo on the output bus (OUT1) is Vo_min.

Besides, the voltage-frequency conversion circuit 207 makes a conversion relationship between the (output) voltage Vo of the output bus (OUT1) and the switching frequency signal fs to be a relationship of a line section AB shown in FIG. 1. When the (output) voltage Vo of the output bus (OUT1) is Vo_max, the switching frequency signal fs output by the voltage-frequency conversion circuit 207 is Fn*fr. Moreover, when the (output) voltage Vo of the output bus (OUT1) is Vo_min, the switching frequency signal fs' output by the voltage-frequency conversion circuit 207 is Fn'*fr. Therefore, each of the resonant conversion circuits LLC1 and LLC2 connected in parallel can be current-balancing, and even if the resonant conversion circuits LLC1 and LLC2 connected in parallel have an error tolerance, and parameters of resonant components are not completely the same, a good current-balancing effective is still achieved. Moreover, the output (load) voltage (vo) provided by the power supply system 20 of the present exemplary embodiment can be perfectly controlled, and a variation range thereof can be set between the minimum output voltage Vo_min and the maximum output voltage Vo_max of an allowable variation range, so as to reduce ripple of the output (load) voltage Vo.

Figure 4:
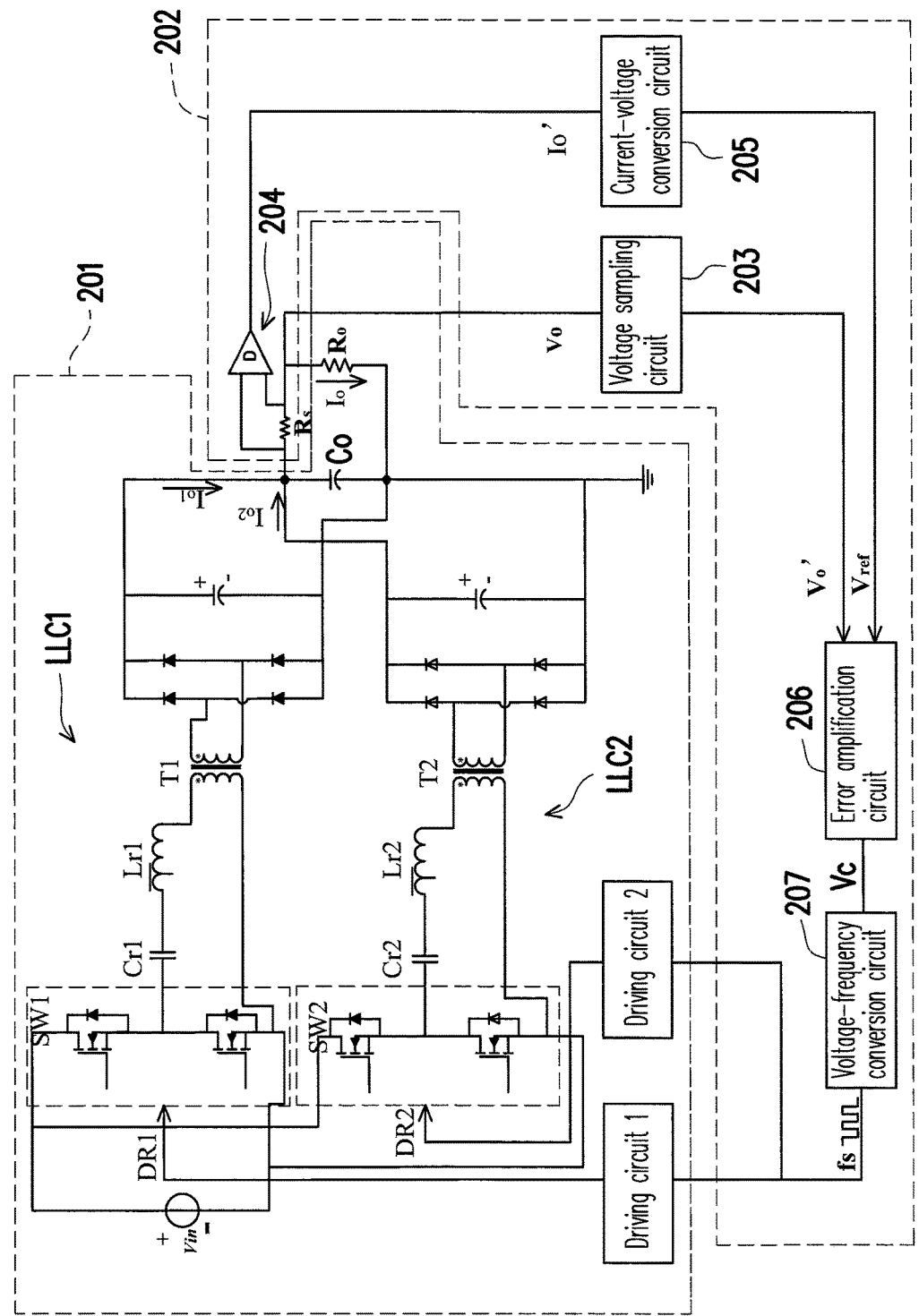
FIG. 4 is a schematic diagram illustrating an implementation of the power supply system of FIG. 2.

FIG. 4 is a schematic diagram illustrating an implementation of the power supply system 20 of FIG. 2. Referring to FIG. 4, the parallel resonant conversion circuits LLC1 and LLC2 of the switch power supply 201 can be respectively a half-bridge series resonant circuit, i.e. each of the resonant conversion circuits LLC1 and LLC2 includes an inverter bridge with a half-bridge structure, a resonant circuit and a rectifier filter circuit sequentially connected in series. Based on an actual design application/requirement, the inverter bridge of the half-bridge structure can be changed to an inverter bridge with a full-bridge structure or a three-level structure, and the resonant conversion circuits LLC1 and LLC2 can be respectively a full-bridge or three-level series resonant circuit. Moreover, the resonant circuit includes an inductor, a capacitor and a transformer connected in series.

In the present exemplary embodiment, the DC input: Vin=400V, the load voltage: Vo_min=11.4V; Vo_max=12.6V and Vo_nom=12V, the output full load current: Ifull=80 A, a resonant frequency of the half-bridge series resonant circuit: fr=120 KHZ, detailed resonant parameters of the resonant conversion circuits LLC1 and LLC2 is shown in a following Table 1, where Lm1 is a magnetizing inductance of a transformer T1 in the resonant conversion circuit LLC1, Lm2 is a magnetizing inductance of a transformer T2 in the resonant conversion circuit LLC2, Lr1 is a resonant inductance of the resonant conversion circuit LLC1, Lr2 is a resonant inductance of the resonant conversion circuit LLC2, Cr1 is a resonant capacitance of the resonant conversion circuit LLC1, and Cr2 is a resonant capacitance of the resonant conversion circuit LLC2, and the two-phase resonant parameters have an error tolerance.

TABLE 1

| Lm1 (μH) | Lm2 (μH) | Lr1 (μH) | Lr2 (μH) | Cr1 (nF) | Cr2 (nF) |
|---|---|---|---|---|---|
| 300 | 369 | 27.273 | 22.091 | 64.5 | 64.5 |

In the embodiment of FIG. 4, the current sampling circuit 204 is implemented by a sampling resistor Rs and a differential circuit D. The sampling resistor Rs (for example, 12 mΩ) is connected in series to the output bus (OUT1), and the differential circuit D samples a voltage at two ends of the sampling resistor Rs to obtain the sampling value Io'. The output of the differential circuit D serves as an input of the current-voltage conversion circuit 205. The sampling value Io' is converted into the voltage reference value Vref by the current-voltage conversion circuit 205. The error amplification circuit 206 amplifies and compensates an error between the sampling value Vo' and the voltage reference value Vref to output the error value Vc, and transmits the error value Vc to the voltage-frequency conversion circuit 207. The voltage-frequency conversion circuit 207 converts the error value Vc into the switching frequency signal fs and provides the same to switch driving circuits (a driving circuit 1 and a driving circuit 2) of the resonant conversion circuits LLC1 and LLC2. The driving circuit 1 and the driving circuit 2 respectively provide a driving signal set (DR1, DR2) to drive switch units SW1 and SW2 serving as the inverter bridges of the half-bridge structure in the resonant conversion circuits LLC1 and LLC2.

Figure 5:
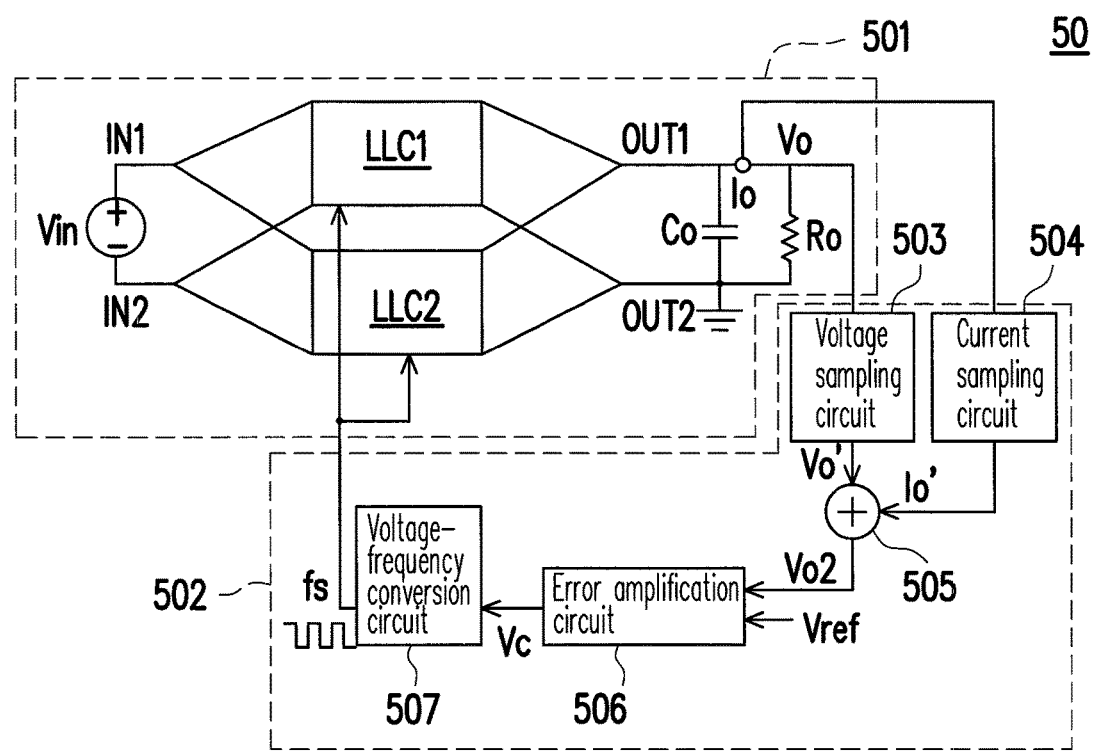
FIG. 5 is a block diagram of a power supply system according to another exemplary embodiment of the invention.

FIG. 5 is a block diagram of a power supply system 50 according to another exemplary embodiment of the invention. Referring to FIG. 5, the power supply system 50 at least includes a switch power supply 501 and a control circuit 502. Similarly, the control circuit 502 controls a switching frequency of the switch power supply 501. Moreover, the switch power supply 501 at least includes a DC input Vin, resonant conversion circuits LLC1 and LL2, an output filter circuit Co and a load circuit Ro. In the present exemplary embodiment, the control circuit 502 and the resonant conversion circuits LLC1 and LLC2 can be regarded as/construct a parallel resonant converter.

The resonant conversion circuits LLC1 and LLC2 are connected in parallel between input buses (IN1, IN2) and output buses (OUT1, OUT2). In the present exemplary embodiment, input terminals of the resonant conversion circuits LLC1 and LLC2 are connected in parallel and are connected to the DC input Vin through the input buses (IN1, IN2), and output terminals of the resonant conversion circuits LLC1 and LLC2 are connected in parallel and are connected to the output filter circuit Co and the load circuit Ro through the output buses (OUT1, OUT2).

The control circuit 502 also provides the switching frequency signal fs to the resonant conversion circuits LLC1 and LLC2, and the control circuit 502 controls the voltage Vo of the output bus (OUT1) to linearly vary along with the switching frequency signal fs in a rated range, so as to achieve current-balancing of the resonant conversion circuits LLC1 and LLC2. The rated range is between the maximum allowable value (Vo_max) of the voltage Vo of the output bus (OUT1) and the minimum allowable value (Vo_min) of the voltage Vo of the output bus (OUT1).

In the present exemplary embodiment, the control circuit 502 at least includes a voltage sampling circuit 503, a current sampling circuit 504, an adder circuit 505, an error amplification circuit 506 and a voltage-frequency conversion circuit 507. The voltage sampling circuit 503 samples the (output) voltage Vo of the output bus (OUT1) and outputs a corresponding sampling value Vo' to the adder circuit 505. The current sampling circuit 504 samples the (output) current Io of the output bus (OUT1) and outputs a corresponding sampling value Io' to the adder circuit 505. A relationship between the sampling value Io' associated with the (output) current Io of the output bus (OUT1) and the (output) current Io of the output bus (OUT1) can be: Io'=(Vo_max−Vo_min)×Io÷Ifull, where Vo_max is an allowable maximum output value of the output bus (OUT1), Vo_min is an allowable minimum output value of the output bus (OUT1), Ifull is a full load current of the output bus (OUT1), Io is the (output) current of the output bus (OUT1), and Io' is a sampling value of the (output) current of the output bus (OUT1).

The adder circuit 505 performs current voltage conversion on the sampling signal Io' for adding with the sampling signal Vo', and an obtained voltage Vo2 and the voltage reference value Vref serve as inputs of the error amplification circuit 506. The error amplification circuit 506 amplifies and compensates an error between the voltage Vo2 and the voltage reference value Vref, and the voltage-frequency conversion circuit 507 converts the output of the error amplification circuit 506 into the switching frequency signal fs, and provides the switching frequency signal fs to each of the resonant conversion circuits LLC1 and LLC2.

In the present exemplary embodiment, the switching frequency signal fs is used for controlling the switching frequencies of switch units in the switch power supply 501. Moreover, the switching frequencies of the resonant conversion circuit LLC1 and the resonant conversion circuit LLC2 are the same, and are all the switching frequency signal fs. Moreover, the voltage reference voltage Vref can be set as the allowable maximum output voltage value Vo_max of the output bus (OUT1).

According to the aforementioned technical solution of the control circuit 202/502, the relationship between gain and frequency of the resonant conversion circuits LLC1 and LLC2 presents a linear relationship AB shown in FIG. 1. In this way, not only the output voltage Vo of the output (DC) bus (OUT1) can be varied between the allowable maximum output voltage value Vo_max and the minimum output voltage value Vo_min on the output (DC) bus (OUT1), the requirement of current-balancing is simultaneously satisfied. In other words, not only current-balancing of the parallel resonant conversion circuits is achieved, but also the output voltage thereof satisfies requirements of electric equipment.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

Moreover, any embodiment of or the claims of the invention is unnecessary to implement all advantages or features disclosed by the invention. Moreover, the abstract and the name of the invention are only used to assist patent searching, and are not used for limiting the invention.

What is claimed is:

1. A parallel resonant converter, comprising:
  a control circuit; and
  at least two resonant conversion circuits, connected in parallel between an input bus and an output bus,
  wherein the control circuit is configured to provide a switching frequency signal to the at least two resonant conversion circuits, and the control circuit controls a voltage of the output bus to linearly vary along with the switching frequency signal in a rated range, so as to achieve current-balancing for the at least two resonant conversion circuits,
  wherein the control circuit is configured to sample a voltage of the output bus to obtain a sampling value associated with the voltage of the output bus, sample a current of the output bus to obtain a sampling value associated with the current of the output bus, calculate based on the sampling value associated with the current of the output bus and the sampling value associated with the voltage of the output bus to obtain an error value, and amplify and compensate the error value for converting into the switching frequency signal,
  wherein the control unit is configured to perform an error calculation between the sampling value associated with the voltage of the output bus and a value obtained by performing a current-voltage conversion on the sampling value associated with the current of the output bus to obtain the error value, or the control unit is configured to perform the error calculation between a first voltage reference value and an adding value which is obtained by adding the sampling value associated with the voltage of the output bus with the value obtained by performing the current-voltage conversion on the sampling value associated with the current of the output bus to obtain the error value.

2. The parallel resonant converter as claimed in claim 1, wherein the control circuit controls a relationship between voltage and current of the output bus as:

$$Vo=Vo\_\max-(Vo\_\max-Vo\_\min)\times Io\div Ifull,$$

wherein Vo is the voltage of the output bus, Ifull is a full load current of the output bus, Io is the current of the output bus, Vo_max is a maximum allowable value of the voltage of the output bus, and Vo_min is a minimum allowable value of the voltage of the output bus.

3. The parallel resonant converter as claimed in claim 2, wherein the rated range is between the maximum allowable value of the voltage of the output bus and the minimum allowable value of the voltage of the output bus.

4. The parallel resonant converter as claimed in claim 2, wherein the control circuit comprises:
  a voltage sampling circuit;
  a current sampling circuit;
  a current-voltage conversion circuit;
  an error amplification circuit; and
  a voltage-frequency conversion circuit,
  wherein the voltage sampling circuit samples the voltage of the output bus and transmits a sampling value associated with the voltage of the output bus to the error amplification circuit,
  wherein the current sampling circuit samples the current of the output bus and converts a sampling value associated with the current of the output bus into a second voltage reference value through the current-voltage conversion circuit for transmitting to the error amplification circuit,
  wherein the error amplification circuit amplifies and compensates an error between the sampling value associated with the voltage of the output bus and the second voltage reference value, and converts the amplified and compensated error into the switching frequency signal through the voltage-frequency conversion circuit, and provides the switching frequency signal to each of the resonant conversion circuits.

5. The parallel resonant converter as claimed in claim 4, wherein a relationship between the sampling value associated with the current of the output bus and the second voltage reference value is:

$$Vref=Vo\_\max-(Vo\_\max-Vo\_\min)\times Io'\div Ifull,$$

wherein Vref is the second voltage reference value, Ifull is the full load current of the output bus, Vo_max is the maximum allowable value of the voltage of the output bus, Vo_min is the minimum allowable value of the voltage of the output bus, and Io' is the sampling value of the current of the output bus.

6. The parallel resonant converter as claimed in claim 2, wherein the control circuit comprises:
  a voltage sampling circuit;
  a current sampling circuit;
  an adder circuit
  an error amplification circuit; and
  a voltage-frequency conversion circuit, wherein the voltage sampling circuit samples the voltage of the output bus and transmits a sampling value associated with the voltage of the output bus to the adder circuit, wherein the current sampling circuit samples the current of the output bus and transmits a sampling value associated with the current of the output bus to the adder circuit, wherein an output of the adder circuit and the first voltage reference value serve as inputs of the error amplification circuit, and an output of the error amplification circuit is converted into the switching frequency signal by the voltage-frequency conversion circuit, and the switching frequency signal is provided to each of the resonant conversion circuits.

7. The parallel resonant converter as claimed in claim 6, wherein a relationship between the sampling value associated with the current of the output bus and the current of the output bus is:

$$Io'=(Vo\_\max-Vo\_\min) \times Io \div Ifull,$$

wherein Vo_max is the maximum allowable value of the voltage of the output bus, Vo_min is the minimum allowable value of the voltage of the output bus, Ifull is the full load current of the output bus, Io is the current of the output bus, and Io' is the sampling value of the current of the output bus.

8. The parallel resonant converter as claimed in claim 7, wherein each of the resonant conversion circuits comprises an inverter bridge, a resonant circuit and a rectifier filter circuit sequentially connected in series.

9. The parallel resonant converter as claimed in claim 8, wherein the inverter bridge is a full-bridge, a half bridge or a three-level structure.

10. The parallel resonant converter as claimed in claim 9, wherein the resonant circuit comprises an inductor, a capacitor and a transformer connected in series.

11. A control method for the parallel resonant converter as claimed in claim 1, comprising:

sampling the voltage of the output bus to obtain a sampling signal associated with the voltage of the output bus;

sampling the current of the output bus to obtain a sampling signal associated with the current of the output bus;

converting the sampling signal associated with the current of the output bus into a voltage reference signal;

amplifying and compensating an error between the sampling signal associated with the voltage of the output bus and the voltage reference signal for converting into the switching frequency signal; and providing the switching frequency signal to each of the at least two resonant conversion circuits.

12. The control method as claimed in claim 11, wherein a relationship between the sampling signal associated with the current of the output bus and the voltage reference signal is:

$$Vref=Vo\_\max-(Vo\_\max-Vo\_\min) \times Io' \div Ifull,$$

wherein Vref is a voltage value of the voltage reference signal, Ifull is a full load current of the output bus, Vo_max is a maximum allowable value of the voltage of the output bus, Vo_min is a minimum allowable value of the voltage of the output bus, and Io' is a sampling value of the current of the output bus.

13. A control method for the parallel resonant converter as claimed in claim 1, comprising:

sampling the voltage of the output bus to obtain a sampling signal associated with the voltage of the output bus;

sampling the current of the output bus to obtain a sampling signal associated with the current of the output bus;

adding a signal obtained by performing a current-voltage conversion on the sampling signal associated with the current of the output bus with the sampling signal associated with the voltage of the output bus to obtain an adding result, and performing an error calculation on the adding result and a voltage reference signal to obtain the error value;

amplifying and compensating the error value for converting into the switching frequency signal; and providing the switching frequency signal to each of the at least two resonant conversion circuits.

14. The control method as claimed in claim 13, wherein a relationship between the sampling value associated with the current of the output bus and the current of the output bus is:

$$Io'=(Vo\_\max-Vo\_\min) \times Io \div Ifull,$$

Wherein Vo_max is a maximum allowable value of the voltage of the output bus, Vo_min is a minimum allowable value of the voltage of the output bus, Ifull is a full load current of the output bus, Io is the current of the output bus, and Io' is a sampling value of the current of the output bus.

* * * * *